United States Patent
Cai et al.

(10) Patent No.: US 8,358,466 B2
(45) Date of Patent: Jan. 22, 2013

(54) OPTICAL DELAY LINE INTERFEROMETERS WITH SILICON DUAL MIRROR FOR DPSK

(75) Inventors: Ming Cai, Fremont, CA (US); Ruibo Wang, Oak Park, CA (US)

(73) Assignee: Oclaro (North America), Inc., San Jose, CA (US)

( * ) Notice: Subject to any disclaimer, the term of this patent is extended or adjusted under 35 U.S.C. 154(b) by 509 days.

(21) Appl. No.: 12/584,886

(22) Filed: Sep. 14, 2009

(65) Prior Publication Data

US 2011/0063728 A1    Mar. 17, 2011

(51) Int. Cl.
G02B 5/30    (2006.01)

(52) U.S. Cl. .................... 359/489.08; 356/491

(58) Field of Classification Search .......... None
See application file for complete search history.

(56) References Cited

U.S. PATENT DOCUMENTS

| 6,654,157 B2 | 11/2003 | Islam et al. |
| 6,704,487 B2 | 3/2004 | Parhami et al. |
| 6,798,551 B2 | 9/2004 | Gu |
| 6,810,171 B2 * | 10/2004 | Zhou et al. ............ 385/24 |
| 6,992,777 B2 | 1/2006 | Han et al. |
| 8,004,749 B1 * | 8/2011 | Hsieh et al. ............ 359/325 |
| 2002/0005970 A1 | 1/2002 | Lang |
| 2010/0189437 A1 * | 7/2010 | Hoshida ............ 398/65 |

OTHER PUBLICATIONS

PCT/US2010/002449 International Search Report (Nov. 2, 2010).

* cited by examiner

*Primary Examiner* — Arnel C Lavarias
(74) *Attorney, Agent, or Firm* — Fenwick & West LLP

(57) ABSTRACT

Delay line interferometer designs using combinations of basic optical components that are expected to simplify manufacture and reduce costs while still providing precision optical performance. The main operative components of these designs are polarization beam splitters, birefringent crystals, optical delay components, and waveplates. Temperature controllers may be provided for adjusting the delay of the optical delay components.

16 Claims, 5 Drawing Sheets

OPTICAL DELAY LINE INTERFEROMETERS WITH SILICON DUAL MIRROR FOR DPSK

FIELD OF THE INVENTION

The invention relates to improvements in optical delay devices and more particularly to optical delay interferometers adapted for differential phase shift keying demodulation systems.

BACKGROUND OF THE INVENTION

Delay line interferometers are typically Mach-Zehnder type or Michelson type interferometers based on multiple beam interference in which one beam is time-delayed to another by a desired interval. As applied to Differential Phase-Shift Keying (DPSK), demodulation delay line interferometers convert a phase-keyed signal into an amplitude-keyed signal. In this application, an incoming DPSK optical signal is split into two equal-intensity beams in two arms of a interferometer, wherein one beam is delayed by a given optical path difference corresponding to a one bit delay in the DPSK scheme. The beams are recombined producing constructive or destructive interference in the time domain for each bit. The resultant interference intensity is the intensity-keyed signal.

Delay line interferometers for DPSK systems are high performance optical devices requiring precision optical components, frequently with costly optical coatings. Simplifying the construction of DPSK demodulators without compromising performance would represent an important advance in the technology.

SUMMARY OF THE INVENTION

We have developed delay line interferometer designs using combinations of basic optical components that are expected to simplify manufacture and reduce costs while still providing precision optical performance. The main operative components of these designs are polarization beam splitters, birefringent crystals, optical delay components, and waveplates.

BRIEF DESCRIPTION OF THE DRAWING

The description of the invention below may be more easily understood when considered in conjunction with the drawing, in which.

DETAILED DESCRIPTION

Figure 1:
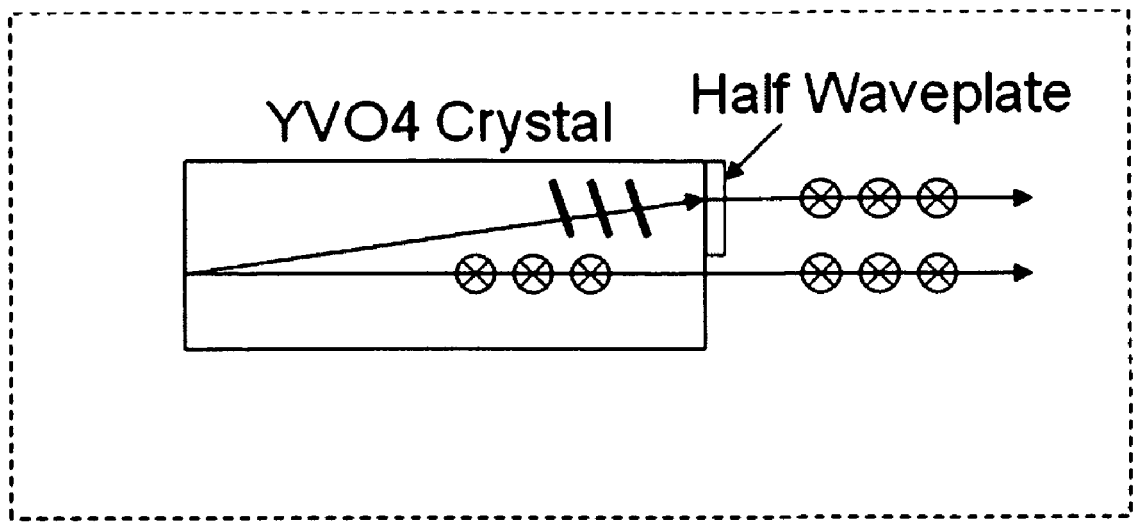
FIGS. 1-8 are schematic representations of the basic optical components and subassemblies for delay line interferometers according to the invention.

With reference to FIG. 1, a side view of a subassembly of a birefringent crystal, in this illustration a yttrium vanadate ($YVO_4$) crystal, with a half waveplate (see FIG. 4) attached as shown. In this arrangement an input optical beam with random polarization state is converted into two parallel beams with the same linear polarization state. The polarization direction, in this illustration, is perpendicular to the drawing. This subassembly will be used as an input collimator for the delay line interferometer of the invention.

Figure 2:
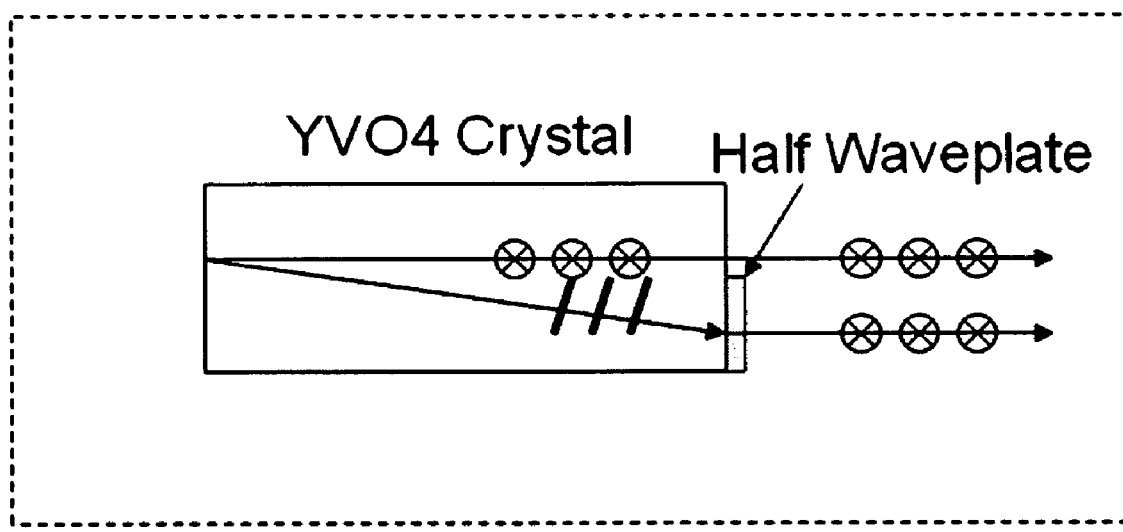

FIG. 2 shows a subassembly for an output collimator used in the delay line interferometer of the invention. It is similar to the subassembly of FIG. 1 except that it is inverted on a horizontal axis. In a device using these subassemblies paired for input and output, polarization mode dispersion (PMD) may be minimized.

The yttrium orthovanadate birefringent crystal in FIGS. 1 and 2 is intended as an example only of a variety of birefringent materials that may be used to perform the function of a beam displacer. Yttrium orthovanadate ($YVO_4$) is a positive uniaxial crystal typically grown using a Czochralski method. It has good mechanical and physical properties and is ideal for optical polarizing components because of its is wide transparency range and large birefringence. Other alternative birefringent materials may be used, such as calcite and rutile. However, compared to calcite, $YVO_4$ has better temperature stability, and physical and mechanical properties. Rutile is very hard, and by comparison, $YVO_4$ is easier to process which reduces cost of fabrication.

Figure 3:
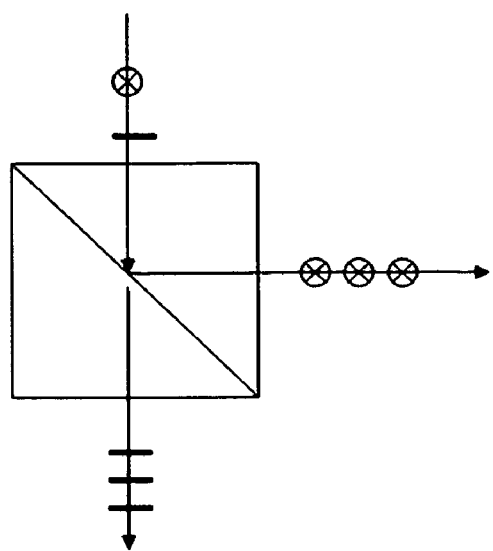

FIG. 3 illustrates a polarization beam splitter (PBS) in which incoming un-polarized or mixed-polarization optical beam is split into two orthogonal linearly polarized optical beams. One beam passes through the PBS along the original propagation direction and the other is deflected at the splitter surface by 90 degrees. Typical optical beam splitters are in the form of a cube, made from two triangular glass prisms which are attached together at their base with an attachment layer. The thickness of the attachment layer is adjusted such that, for a given wavelength, half of the light incident through one face of the cube is reflected and the other half is transmitted due to total internal reflection. In PBS components, the prisms are birefringent, so that a polarized incoming beam is split into beams of different polarization.

Figure 4:
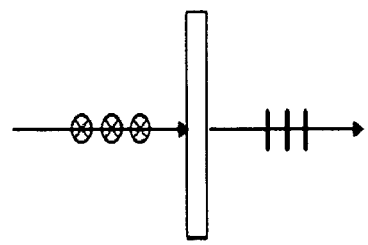
Figure 5:
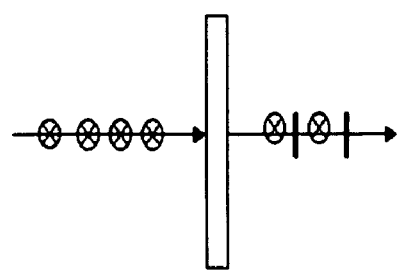

FIGS. 4 and 5 show optical waveplates. FIG. 4 shows a half wave plate and FIG. 5 shows a quarter wave plate. A wave plate, or retarder, is an optical device that alters the polarization state of a light wave travelling through it. A wave plate works by shifting the phase between two perpendicular polarization components of the light wave. A typical wave plate is a birefringent crystal with a chosen orientation and thickness. The crystal is cut so that the extraordinary optic axis is parallel to the surfaces of the plate. Light polarized along this axis travels through the crystal at a is different speed than light with the perpendicular polarization, creating a phase difference. Depending on the thickness of the crystal, light with polarization components along both axes will emerge in a different polarization state. As illustrated in FIG. 5, a quarter wave plate creates a quarter wavelength phase shift and will convert a linear polarization into a circular polarization. A half wave plate, illustrated in FIG. 4, retards one polarization by half a wavelength, or 180 degrees, and thus will rotate a linear polarization by 90 degrees.

Figure 6:
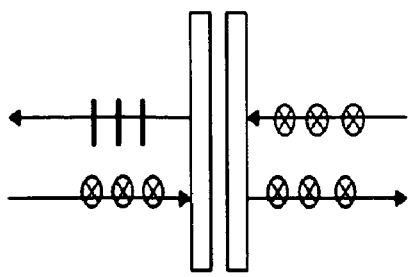

The optical subassembly shown in FIG. 6 is a combination of a Faraday rotator and a half wave plate at 22.5 degrees. As illustrated, this combination maintains polarization unchanged when an optical beam is transmitted through it in a first direction, but rotates a linear polarization by 90 degrees when an optical beam propagates through it in the opposite direction. The Faraday rotator is a well known optical device that rotates the polarization of light due to a magneto-optic effect. i.e., one polarization of the input light is in ferromagnetic resonance with the material, which causes its phase velocity to be higher than the other.

Figure 7:
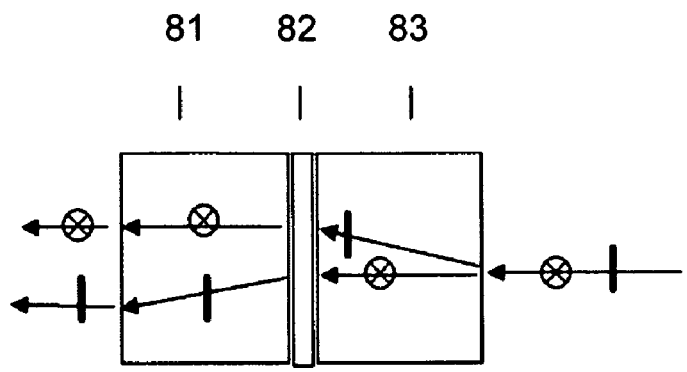

FIG. 7 shows a subassembly comprising a combination of two birefringent crystals, e.g., $YVO_4$ crystals, 81 and 83 in the figure, separated by a half wave plate at 45 degrees, shown at 82 in the figure. This combination converts an input un-polarized or mixed-polarization optical beam into two beams with orthogonal polarization states. The two beams propagate in the same direction, but are separated from each other at a distance determined by the length of the YVO$_4$ crystal.

Figure 8:
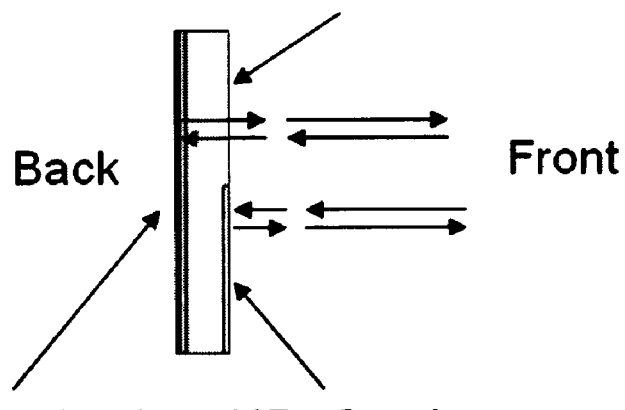

FIG. 8 shows a dual mirror designed with the back surface coated with high reflection (HR) coating, and the front surface divided into two areas. The preferred material for the dual mirror is silicon. Other materials may provide equivalent or similar functions. The lower half of the front surface of the dual mirror is coated with a high reflection (HR) coating and the upper half is coated with an anti-reflection (AR) coating. An optical beam incident on the upper half of the dual mirror will transmit through as shown and reflect from the back surface of the silicon mirror. A light beam incident on the lower half of the dual mirror will be reflected back immediately by the front surface.

The components and subassemblies described above are assembled to produce embodiments of delay line interferometers that are especially adapted for DPSK systems.

Figure 9:
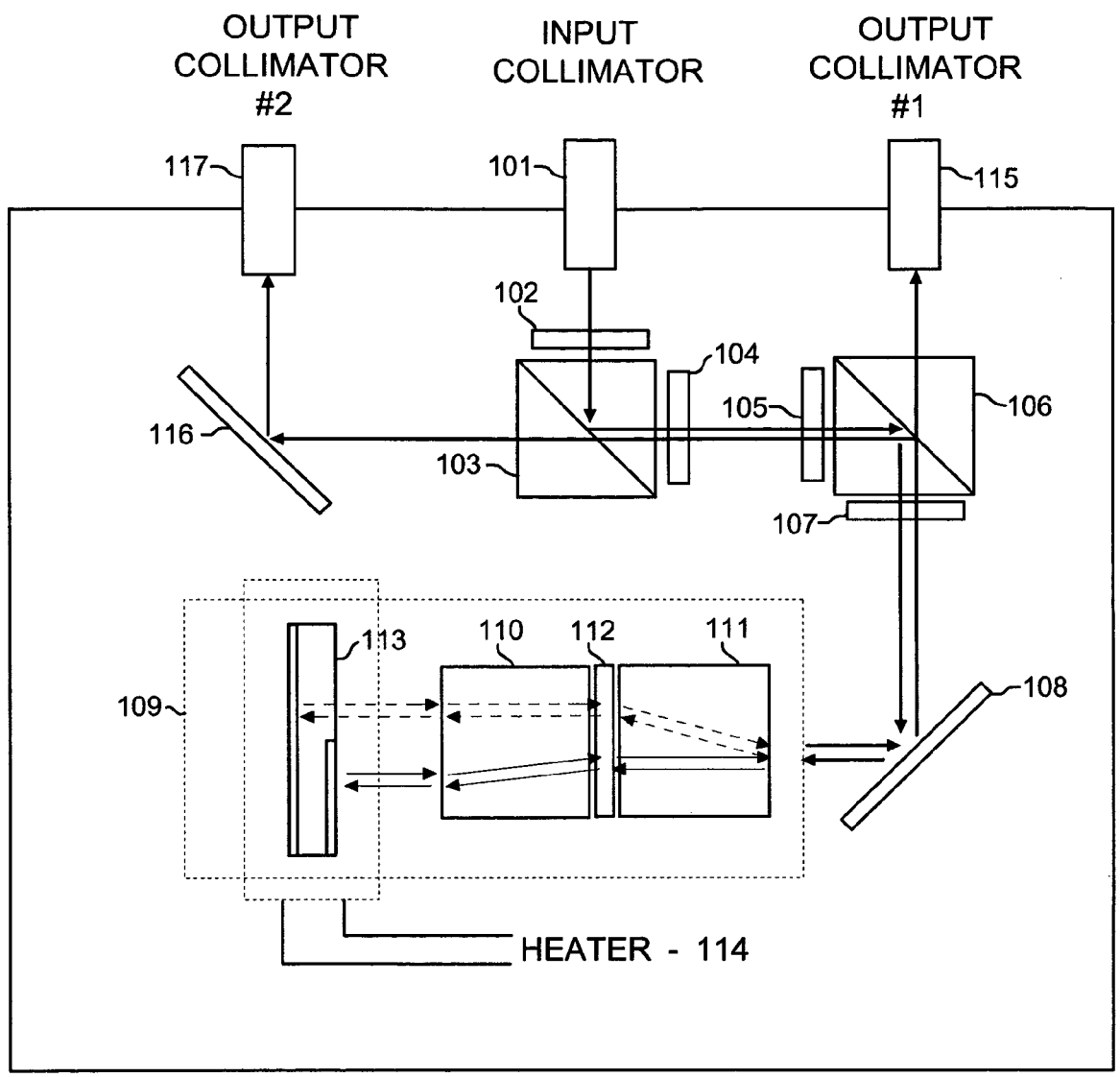
FIG. 9 is a schematic representation of one embodiment of a delay line interferometer useful for a DPSK system.

FIG. 9 shows one embodiment of the invention. In FIG. 9 an input optical signal of random polarization states passes through the input collimator 101 to become linearly polarized light. In the example represented by FIG. 9 the polarization direction, viewed from the top, is parallel to the drawing surface and perpendicular to the propagation direction. The incoming signal is also converted into two optical beams that are parallel to each other and spatially separated in the plane perpendicular to the drawing surface. This is illustrated in FIG. 1.

The separated optical beams then pass through a 45° half wave plate 102 so that the polarization state is rotated by 90°, and now orientated perpendicular to the drawing surface. The optical beams are then deflected by 90° to the right by the PBS 103, and then pass through the Faraday rotator and 22.5° half wave plate subassembly, 104, 105 (see illustration in FIG. 6), which is designed to preserve the polarization state of the optical beams when transmitting through from left to right. The optical beams are then deflected by 90° by the PBS 106, transmitted through quarter wave plate 107, and onto mirror 108. The quarter wave plate 107 converts the linear polarization into circular polarization. Mirror 108 directs the optical beams to the subassembly 109. The subassembly 109 comprises a YVO$_4$ pair 110 and 111, and a 45° half wave plate 112, and splits an incoming beam with circular polarization states into two beams with equal intensity (power) and orthogonal linear polarization states. Thus the two incoming signal beams (in the plane perpendicular to the drawing surface) become four beams. The added beams are shown in FIG. 9 as dashed lines, and the intensity of the dashed line beams are equal to that of the solid line beams.

The optical beams are then directed to the silicon dual mirror 113. The dashed line beams are incident on the upper portion of the silicon dual mirror and the solid line beams are incident on the lower portion, as illustrated in FIG. 8. The dashed line beams penetrate through the dual mirror and are reflected from the back surface while the solid line beams are reflected directly from the front surface. The dashed line beams thus travel a longer distance than the solid line beams. The beams are reflected for an additional pass through the YVO$_4$ pair to and 45° half wave plate. The dashed line beams are combined with the solid line beams that are delayed in time sequence. The time delay is defined by the optical path difference, i.e., the thickness of the silicon dual mirror 113. If the thickness of the silicon dual mirror is set precisely to generate a one-bit time span of the incoming phase modulated signal, the re-combination of the beams occurs exactly between two sequential bits.

The recombined optical beams are reflected by mirror 108 to pass the quarter wave plate 107 along the same path as before. The polarization states of the recombined optical beams are set by the phase difference between the dashed line and solid line optical beams, which are composed of two orthogonal linearly polarized beams with one in the plane of the drawing surface and the other perpendicular to the drawing surface. The beams that are polarized in the same plane of the drawing surface pass through PBS 106 and exits at output collimator 115. The beams that are polarized perpendicular to the drawing surface are deflected by PBS 106. The polarization states of the deflected beams are rotated by 90° after passing through the 22.5° half wave plate 105 and the Faraday rotator 104. Those beams then pass through PBS 103 towards mirror 116, and are directed to output collimator 117.

The refractive index of silicon is highly dependent on temperature, and hence the phase difference between the dashed line beams and the solid line beams in FIG. 9 also depends on temperature. Recognizing this, a heater 114 may be placed in operative relationship with silicon dual mirror 113 to control the temperature of the silicon mirror, thereby controlling the phase difference between the two beams. This effectively tunes the central wavelength of the device between constructive and destructive interference.

Alternatively, the silicon mirror may be replaced with an electro-optic device that performs the same function, i.e., provides a variable length optical path selectively for one set of beams. This option produces equivalent optical results is with quick response. Either of these, and other alternatives that will occur to those skilled in the art, may be considered, generically, variable optical delay components.

It should be understood by those skilled in the art that the optical path shown in FIG. 9 is but one choice. For example, it is immediately apparent that mirror 116 is not necessary if the output collimator is located to the left of FIG. 9. The optical path may be directed and redirected between components and subassemblies as desired, using reflective surfaces or equivalent beam steering optics. For efficient placement of optical components in a useful commercial embodiment of the invention, the beam will typically undergo one or more turns. In the usual case these will be 90 or 180 degrees and the beams will be directed perpendicular to the components/subassemblies to avoid refraction, walk-off, or other unwanted effects. In some cases, advantages may be found in other configurations. An optical path between components and subassemblies may be defined whether or not an optical beam is present.

To summarize the embodiment shown in FIG. 9, an optical path may be defined as follows:
   Input optical beam passes in sequence through:
   input collimator comprising a first birefringent device
   first 45 degree half wave plate
   first polarization beam splitter
   first Faraday rotator
   first 22.5 degree half wave plate
   second polarization beam splitter
   first quarter wave plate
   second birefringent device
   second 45 degree half wave plate
   third birefringent device
   variable delay device
   reflector
   third birefringent device
   second 45 degree half wave plate
   second birefringent device
   first quarter wave plate second polarization beam splitter with first and second output paths
first output path:
first output collimator comprising fourth birefringent device
second output path:
first 22.5 half wave plate
first Faraday rotator
first polarization beam splitter
second output collimator comprising fifth birefringent device.

As just suggested, the optical path in FIG. 9 is folded using reflectors to reduce the overall size of the device, and to reuse several components that are common to more than one optical path. In the arrangement of FIG. 9 the reused components are:
first polarization beam splitter
first Faraday rotator
first 22.5 degree half wave plate
second polarization beam splitter
first quarter wave plate
second birefringent device
second 45 degree half wave plate
third birefringent device However, the same combination of general functions may be obtained by eliminating the reflector associated with variable delay device. The optical beam in this embodiment transmits once through the delay element and accordingly may undergo lower loss. The optical paths are then described as:
input collimator comprising a first birefringent device
45 degree half wave plate
first polarization beam splitter
first Faraday rotator
first 22.5 degree half wave plate
second polarization beam splitter
first quarter wave plate
second birefringent device
45 degree half wave plate
third birefringent device
variable delay device
quarter wave plate
third polarization beam splitter with first and second output paths:
first output path:
first output collimator comprising fourth birefringent device
second output path:
second 22.5 half wave plate
second Faraday rotator
fourth polarization beam splitter
second output collimator comprising fifth birefringent device.

Figure 10:
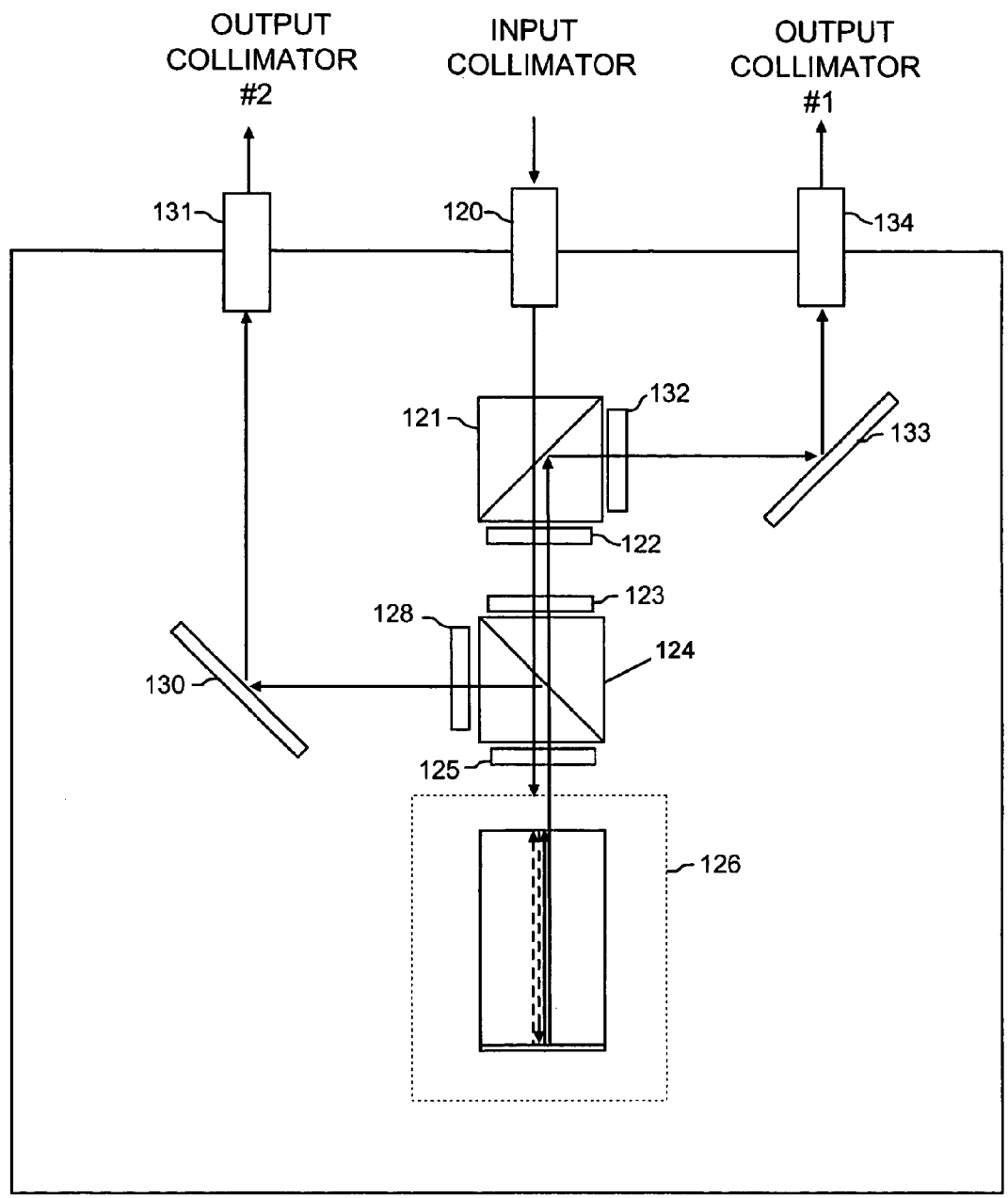
FIG. 10 is a schematic representation of an alternative embodiment of a delay line interferometer useful for a DPSK system.

Another alternative embodiment of the invention is shown in FIG. 10. This embodiment is similar to the first embodiment but has components and subassemblies re-arranged as just described, and a different optical path between components and subassemblies. The main functional difference between the embodiments of FIGS. 9 and 10 is that in FIG. 10, a YVO$_4$ reflector is used to split an incoming beam into beams of equal intensity, and simultaneously generates phase difference between the two split beams. The YVO$_4$ reflector is designed to have the birefringent optical axis perpendicular to the incoming beam propagation direction. Hence the incoming circular polarized beams (after the quarter wave plate) still propagate in the same physical space, but the half portion of the incoming beam, which polarizes in the same direction of the optical axis, undergoes the extraordinary refractive index ($n_e$) and the other half portion of the incoming beam, which polarizes in the orthogonal direction to the optical axis, undergoes the ordinary refractive index ($n_o$).

The refractive indices $n_e$ and $n_o$ are also temperature dependent, so a heater or thermoelectric cooler (not shown in FIG. 10), or equivalents, can be used for central wavelength tunability.

To summarize the embodiment shown in FIG. 10, an optical path may be defined as follows.
Input optical beam passes in sequence through:
input collimator 120 comprising a first birefringent device
first polarization beam splitter 121
Faraday rotator 122
22.5 degree half wave plate 123
second polarization beam splitter 124
first quarter wave plate 125
variable delay device 126
first quarter wave plate 125
second polarization beam splitter with first and second output paths 124
first output path:
22.5 degree half wave plate 123
Faraday rotator 122
first polarization beam splitter 121
45 degree half wavelength plate 132 and mirror 133
first output collimator 134 comprising second birefringent device
second output path:
45 degree half wavelength plate 128 and mirror 130
second output collimator 131 comprising third birefringent device The arrangement of FIG. 10 may also be modified, in a manner similar to that described above, to produce a transmissive device.

The term "coupled" when used in the context of the invention means optically coupled in any suitable manner.

The embodiments shown in FIGS. 9 and 10 illustrate but two of many potential combinations of optical elements used to produce two optical paths, a first optical path and a second optical path. Both employ an optical delay device in the first and second optical path for producing a differential optical delay between the first optical path and the second optical path.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. An optical interferometer comprising:
an input collimator;
first and second output collimators; and
an optical delay device positioned within a first optical path between the input collimator and the first output collimator and a second optical path between the input collimator and the second output collimator, the optical delay device being configured to produce a differential optical delay between the first optical path and the second optical path, wherein the optical delay device includes a first and second beam displacer, a half wave plate and a variable delay device, and wherein the variable delay device comprises a silicon dual mirror.

2. The optical interferometer of claim 1, wherein the silicon dual mirror includes a back surface coated with a high reflection coating and a front surface having a first portion coated with a high reflection coating and a second portion coated with an anti-reflection coating.

3. The optical interferometer of claim 2, wherein beams that move along the first optical path are reflected by the back surface of the silicon dual mirror and the beams that move along the second optical path are reflected by the first portion of the front surface of the silicon dual mirror.

4. The optical interferometer of claim 1, wherein the optical delay device further includes a heater attached to the silicon dual mirror.

5. The optical interferometer of claim 4, wherein the heater is configured to control a phase difference between beams reflected by the silicon dual mirror by controlling a temperature of the silicon dual mirror.

6. The optical interferometer of claim 1, wherein the variable delay device comprises an electro-optic device.

7. The optical interferometer of claim 1, further comprising one or more polarization beam splitters that are configured to direct beams along the first optical path and the second optical path.

8. An optical interferometer comprising:
an input collimator;
one or more polarization beam splitters that are configured to direct the beams from the input collimator along a first optical path and a second optical path; and
an optical delay device positioned within the first optical path and the second optical path, the optical delay device being configured to produce a differential optical delay between the first optical path and the second optical path, wherein the optical delay device includes a variable delay device which comprises a silicon dual mirror.

9. The optical interferometer of claim 8, wherein the optical delay device includes a first and second beam displacer, and a half wave plate.

10. The optical interferometer of claim 9, wherein the half wave plate is disposed between the first and second beam displacer.

11. The optical interferometer of claim 9, wherein the variable delay device is positioned adjacent the second beam displacer such that the beams passing through the beam displacers and the half wave plate are redirected back through the beam displacers and the half wave plate.

12. The optical interferometer of claim 9, wherein the variable delay device comprises an electro-optic device.

13. The optical interferometer of claim 8, wherein the silicon dual mirror includes a back reflective surface for reflecting the beams that move along the first optical path and a front reflective surface for reflecting the beams that move along the second optical path.

14. The optical interferometer of claim 8, further comprising a first output collimator configured to receive the beams passing through the first optical path and a second output collimator configured to receive the beams passing through the second optical path.

15. An optical interferometer comprising:
one or more polarization beam splitters that are configured to direct beams from an input collimator along a first optical path toward a first output collimator, and along a second optical path toward a second output collimator; and
an optical delay device positioned within the first optical path and the second optical path, the optical delay device being configured to produce a differential optical delay between the first optical path and the second optical path, wherein the optical delay device includes a silicon dual mirror.

16. The optical interferometer of claim 15, wherein the optical delay device includes an electro-optic device.

* * * * *